(12) United States Patent
Anderson et al.

(10) Patent No.: US 10,322,806 B2
(45) Date of Patent: Jun. 18, 2019

(54) SLIDING CLOSET

(71) Applicant: The Boeing Company, Chicago, IL (US)

(72) Inventors: Anthony Earl Anderson, Snohomish, WA (US); Dennis Nantin Mara, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 668 days.

(21) Appl. No.: 14/987,348

(22) Filed: Jan. 4, 2016

(65) Prior Publication Data
US 2017/0190425 A1 Jul. 6, 2017

(51) Int. Cl.
*B64D 11/00* (2006.01)
*B63B 29/14* (2006.01)

(52) U.S. Cl.
CPC ...... *B64D 11/003* (2013.01); *B63B 2029/145* (2013.01); *B64D 2011/0046* (2013.01)

(58) Field of Classification Search
CPC .......... B64D 11/003; B64D 2011/0046; B63B 2029/145
See application file for complete search history.

(56) References Cited

U.S. PATENT DOCUMENTS

| | | | |
|---|---|---|---|
| 5,083,727 A | 1/1992 | Pompei et al. | |
| 5,833,329 A | 11/1998 | Smith et al. | |
| 6,007,025 A * | 12/1999 | Coughren | B64D 11/02 105/329.1 |
| 6,547,183 B2 | 4/2003 | Farnsworth | |
| 7,980,511 B2 * | 7/2011 | Janboecke | A61G 3/00 105/319 |
| 8,519,824 B1 * | 8/2013 | Rankin | B64D 11/00 244/118.5 |
| 8,662,444 B2 * | 3/2014 | Tappe | B64D 11/02 244/117 R |
| 8,944,377 B2 * | 2/2015 | McIntosh | E03D 11/00 244/118.5 |
| 2002/0062521 A1 | 5/2002 | Itakura | |
| 2003/0025036 A1 | 2/2003 | Farnsworth | |
| 2012/0119029 A1 | 5/2012 | Tappe et al. | |
| 2012/0248245 A1 | 10/2012 | Schliwa | |
| 2015/0115100 A1 | 4/2015 | Schliwa et al. | |
| 2017/0023027 A1 * | 1/2017 | Claflin | B64D 11/04 |
| 2018/0208317 A1 * | 7/2018 | Heidtmann | B64D 11/04 |

FOREIGN PATENT DOCUMENTS

GB 2000960 A 1/1979

OTHER PUBLICATIONS

Extended European Search Report, dated May 22, 2017, regarding Application No. 16192320.6, 12 pages.
Hills, "Systems and Methods for Refreshing Passenger Garments Onboard an Aircraft," U.S. Appl. No. 14/886,530, filed Oct. 19, 2015, 32 pages.

* cited by examiner

*Primary Examiner* — Brian M O'Hara
(74) *Attorney, Agent, or Firm* — Yee & Associates, P.C.

(57) ABSTRACT

A method and apparatus for providing a sliding closet. The sliding closet comprises an exterior wall, a first wall, a second wall, a number of openings, a movement system, and a number of cavities. The exterior wall faces into a passenger cabin of a vehicle. The first wall and the second wall are perpendicular to the exterior wall. The number of openings is parallel to the exterior wall. The number of cavities is formed by the exterior wall, the first wall, the second wall, and the number of openings.

11 Claims, 15 Drawing Sheets

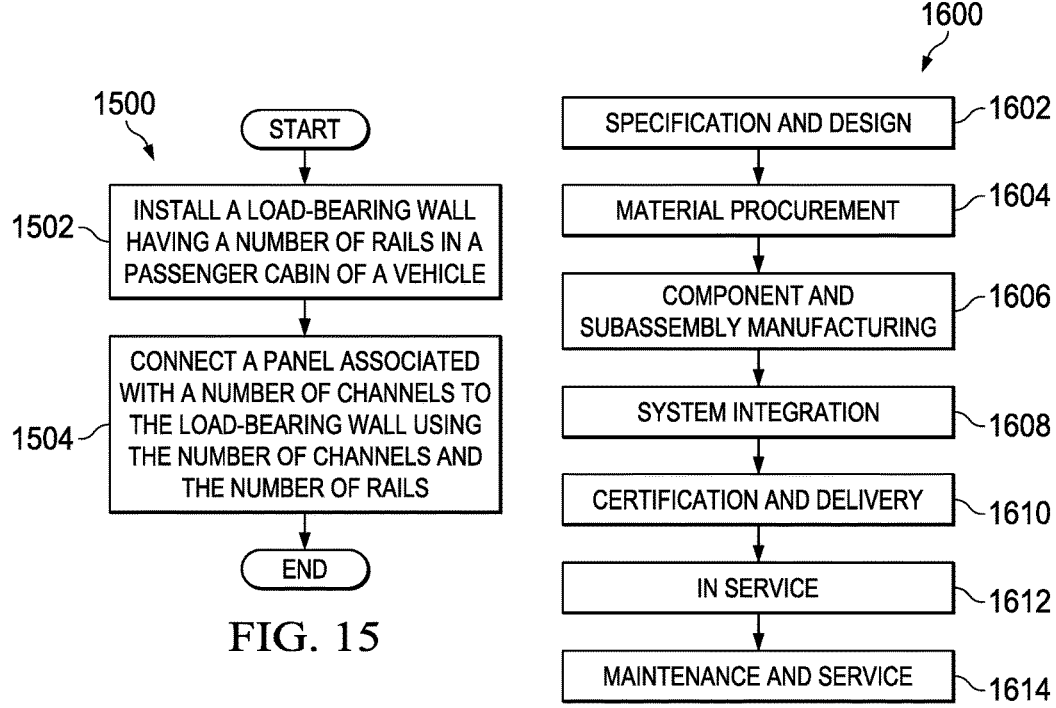
FIG. 15
FIG. 16
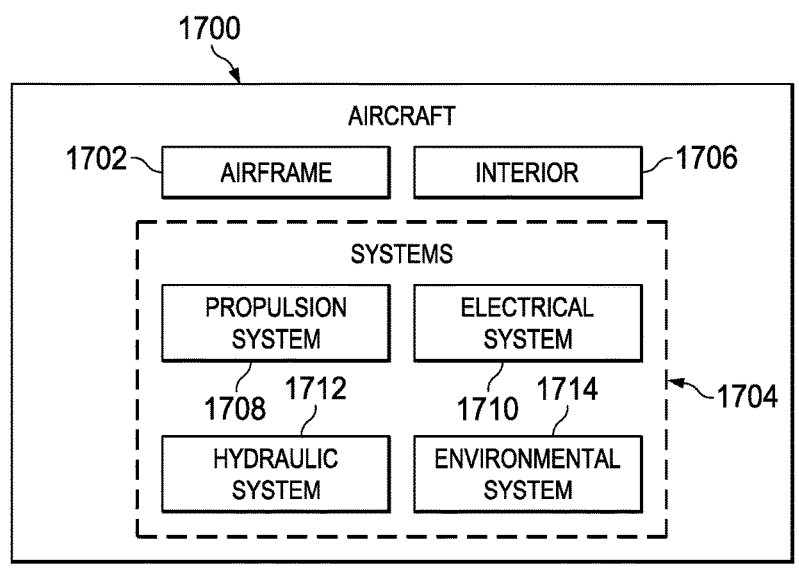
FIG. 17

SLIDING CLOSET

BACKGROUND INFORMATION

1. Field

The present disclosure relates generally to storage of items and, in particular, to storage of smaller items. Still more particularly, the present disclosure relates to a sliding closet for storing smaller items in an aircraft.

2. Background

In commercial aviation, passengers may bring carry-on items, such as jackets, clothing, or other small items into the passenger cabin. Small items may be stored within a passenger cabin in storage areas. Storage areas in the passenger cabin include areas on the floor underneath the passenger seats, overhead compartments, and closets in the front of each passenger cabin.

Conventional closets on airplanes may face towards the entry aisle, providing a closet with a greater width than depth. Passengers may place small items into the conventional closets upon entering the airplane.

Some conventional closets may face into the aisle of the passenger cabin. These conventional closets may have a width less than the depth. As a result, it may be undesirably difficult to access items in the back of the closet. Some of these conventional closets may have internal panels that prevent items from getting out of reach of the passengers. These internal panels may decrease the depth of the closet. The internal panels may create wasted volume in the aircraft.

Therefore, it would be desirable to have a method and apparatus that take into account at least some of the issues discussed above, as well as other possible issues. For example, it may be desirable to create useable closets with a width less than a depth.

SUMMARY

In one illustrative embodiment, a sliding closet is provided. The sliding closet comprises an exterior wall, a first wall, a second wall, a number of openings, a movement system, and a number of cavities. The exterior wall faces into a passenger cabin of a vehicle. The first wall and the second wall are perpendicular to the exterior wall. The number of openings is parallel to the exterior wall. The number of cavities is formed by the exterior wall, the first wall, the second wall, and the number of openings.

In another illustrative embodiment, an apparatus comprises a load-bearing wall and a panel. The load-bearing wall has a number of rails inside a passenger cabin of a vehicle. The panel is connected to the load-bearing wall using the number of rails.

In yet another illustrative embodiment, a method is presented. A load-bearing wall having a number of rails is installed in a passenger cabin of a vehicle. A panel associated with a number of channels is connected to the load-bearing wall using the number of channels and the number of rails.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 15 is an illustration of a flowchart of a method for creating an assembly in a passenger cabin of a vehicle in accordance with an illustrative embodiment;

FIG. 16 is an illustration of an aircraft manufacturing and service method in the form of a block diagram in accordance with an illustrative embodiment; and FIG. 17 is an illustration of an aircraft in the form of a block diagram in which an illustrative embodiment may be implemented.

DETAILED DESCRIPTION

The different illustrative embodiments recognize and take into account one or more different considerations. For example, the illustrative embodiments recognize and take into account that design of aircraft interiors may take an undesirable amount of time. For example, each customer may have a desirable layout for a passenger cabin. By changing some components, loads may be recalculated for load-bearing walls in the passenger cabin. The load-bearing walls may be redesigned for each consumer passenger cabin design. Redesigns may take an undesirable amount of design time or manufacturing time.

The different illustrative embodiments also recognize and take into account that consumers may wish to retroactively add features to pre-existing passenger cabins. For example, a consumer may wish to change the finishes or décor of a bulkhead after delivery and receipt. Alternatively, a consumer may wish to add or remove storage to a passenger cabin after delivery and receipt.

Figure 1:
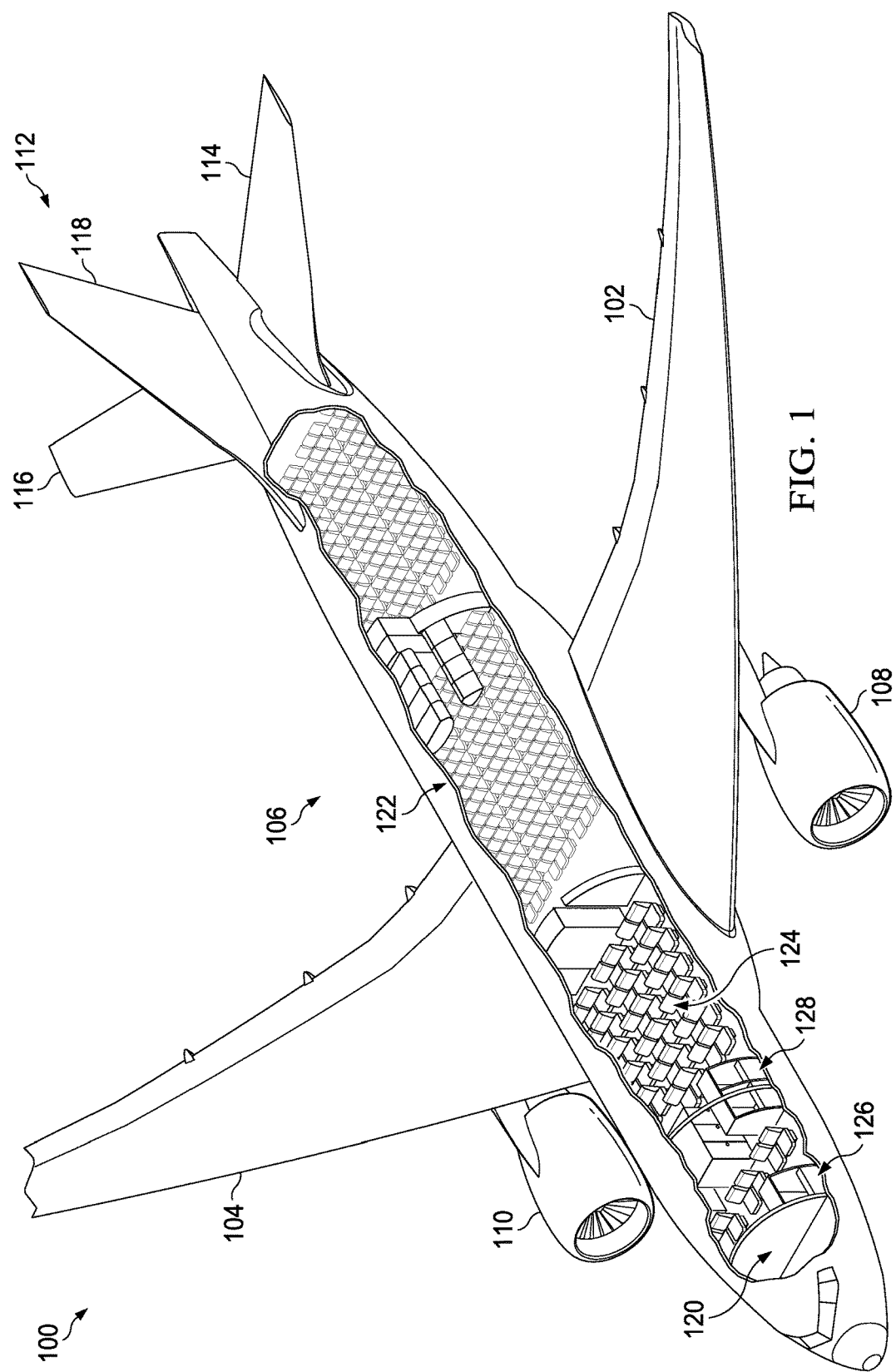
FIG. 1 is an illustration of an aircraft in which an illustrative embodiment may be implemented.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Body 106 also has cockpit 120 and passenger cabin 122. In this example, passenger cabin 122 may include passenger seating in seating area 124. Passenger seating may include a number of aircraft seats. As used herein, a "number of" items means one or more items. For example, a number of aircraft seats means one or more aircraft seats.

Further, seating area 124 in passenger cabin 122 may also include storage areas, such as a number of overhead compartments. Passenger cabin 122 also may include lavatory 126 and galley area 128. These two areas may be partitioned or separated from seating area 124 by a partitioning structure such as, for example, without limitation, a wall.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, or other suitable types of aircraft. Also, other areas may be present in addition to seating area 124, lavatory 126, and galley area 128. Other areas may include, for example, without limitation, closets, storage areas, lounges, or other suitable areas for passenger seating. As another example, airplane seats within seating area 124 may be arranged differently from the depicted example. In other illustrative embodiments, some seats may be grouped into sets of single seats instead of three seats or pairs of seats, as is illustrated in seating area 124.

Figure 2:
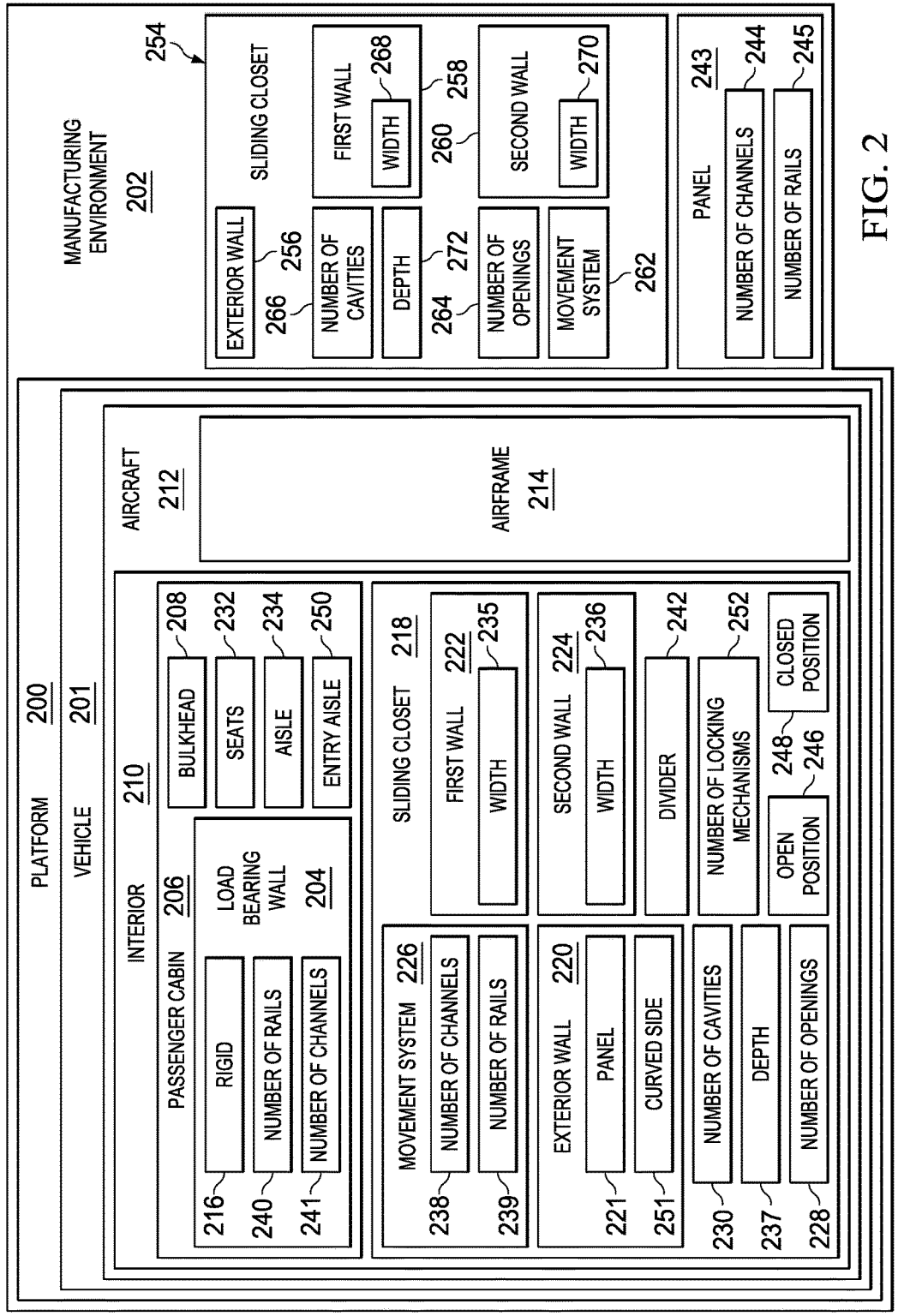
FIG. 2 is an illustration of a block diagram of a manufacturing environment in accordance with an illustrative embodiment.

With reference now to FIG. 2, an illustration of a block diagram of a manufacturing environment is depicted in accordance with an illustrative embodiment. In FIG. 2, platform 200 may be one implementation of aircraft 100 in FIG. 1. Although the illustrative examples for an illustrative embodiment are described with respect to an aircraft, an illustrative embodiment may be applied to other types of platforms. Platform 200 may be, for example, a mobile platform, a stationary platform, a land-based structure, an aquatic-based structure, or a space-based structure. More specifically, platform 200 may be a surface ship, a tank, a personnel carrier, a train, a spacecraft, a submarine, an automobile, a house, a manufacturing facility, a building, or other suitable platforms. In some illustrative examples, platform 200 may take the form of vehicle 201.

A number of components may be installed within platform 200 in manufacturing environment 202. A component that may be installed in platform 200 includes load-bearing wall 204.

In some illustrative examples, load-bearing wall 204 may be originally installed in platform 200. Load-bearing wall 204 may be an original component of platform 200. In other illustrative examples, load-bearing wall 204 may be retrofit into platform 200. A different wall may be present in platform 200 originally. Load-bearing wall 204 may replace the original wall.

Load-bearing wall 204 may be installed in passenger cabin 206 of platform 200. Load-bearing wall 204 may take the form of bulkhead 208 in interior 210 of aircraft 212. Load-bearing wall 204 in aircraft 212 is not merely cosmetic. Load-bearing wall 204 may carry a load from airframe 214 of aircraft 212.

Load-bearing wall 204 is substantially rigid 216 to carry a load from airframe 214. Load-bearing wall 204 is substantially rigid 216 to hold sliding closet 218.

Sliding closet 218 includes exterior wall 220, first wall 222, second wall 224, movement system 226, number of openings 228, and number of cavities 230. Exterior wall 220 faces into passenger cabin 206 of vehicle 201. Exterior wall 220 may form a back for sliding closet 218. Exterior wall 220 may face seats 232 of passenger cabin 206. Exterior wall 220 may have any desirable aesthetic finish.

In some illustrative examples, exterior wall 220 may be referred to as panel 221. In other illustrative examples, panel 221 may be a decorative panel attached to exterior wall 220. Panel 221 may face seats 232 of passenger cabin 206.

First wall 222 and second wall 224 are perpendicular to exterior wall 220. First wall 222 and second wall 224 may form sides of sliding closet 218. First wall 222 faces into passenger cabin 206 of vehicle 201. First wall 222 may face aisle 234 of passenger cabin 206.

First wall 222 has width 235. Second wall 224 has width 236. Width 235 and width 236 are the same. Changing width 235 of first wall 222 and width 236 of second wall 224 changes depth 237 of sliding closet 218.

Movement system 226 takes the form of at least one of number of channels 238 parallel to number of openings 228 or number of rails 239 parallel to number of openings 228. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

When movement system 226 includes number of channels 238, load-bearing wall 204 includes number of rails 240. In this example, number of channels 238 is configured to connect to number of rails 240 such that sliding closet 218 may move along number of rails 240. When movement system 226 includes number of rails 239, load-bearing wall 204 includes number of channels 241. In this example, number of rails 239 is configured to connect to number of channels 241 such that sliding closet 218 may move along number of channels 241.

Number of openings 228 is parallel to exterior wall 220. Items may be placed into sliding closet 218 through number of openings 228.

Number of cavities 230 is formed by exterior wall 220, first wall 222, second wall 224, and number of openings 228. Items may be placed into and stored within number of cavities 230 of sliding closet 218. In some illustrative examples, sliding closet 218 may also include divider 242. When sliding closet 218 includes divider 242, number of cavities 230 is further formed by divider 242. Divider 242 may increase the quantity of number of cavities 230.

In some illustrative examples, sliding closet 218 may be installed in platform 200 in manufacturing environment 202. In other illustrative examples, sliding closet 218 may be installed in platform 200 while platform 200 is undergoing maintenance. In some examples, sliding closet 218 may be installed in platform 200 while platform 200 is in service.

In some illustrative examples, sliding closet 218 may be initially installed in platform 200. In other illustrative examples, sliding closet 218 may be retroactively applied. When sliding closet 218 is retroactively applied, sliding closet 218 may replace a previously installed component.

For example, sliding closet 218 may replace panel 243. Panel 243 may be a decorative panel. Panel 243 may remain stationary when connected to load-bearing wall 204.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

Panel 243 may have at least one of number of channels 244 or number of rails 245 to interface with load-bearing wall 204. In some illustrative examples, panel 243 may be connected to load-bearing wall 204 when a sliding closet, such as sliding closet 218, is not desired in platform 200. In these illustrative examples, panel 243 may disguise at least one of number of channels 241 or number of rails 240. In one example, panel 243 may serve other functions other than aesthetics. For example, panel 243 may provide advertising.

In some illustrative examples, panel 243 may be connected to load-bearing wall 204 as a placeholder until a sliding closet may be installed. In these illustrative examples, panel 243 may be removed when a sliding closet is being installed. For example, panel 243 may be removed and sliding closet 254 or sliding closet 218 may be installed.

Sliding closet 218 may move relative to load-bearing wall 204 using movement system 262. To place sliding closet 218 into open position 246, sliding closet 218 may move towards aisle 234.

When sliding closet 218 is in open position 246, number of cavities 230 is accessible. When sliding closet 218 is in closed position 248, number of cavities 230 is not accessible. When sliding closet 218 is in open position 246, number of cavities 230 faces away from seats 232. When sliding closet 218 is in open position 246, number of cavities 230 may face entry aisle 250 of aircraft 212.

When platform 200 is aircraft 212, exterior wall 220 may have curved side 251. Curved side 251 may follow a curve formed by airframe 214. For example, curved side 251 may follow the interior curve of body 106 of aircraft 100 of FIG. 1. Curved side 251 may be complementary to an interior surface of passenger cabin 206 of the aircraft 212.

To restrain sliding closet 218 from movement, sliding closet 218 includes number of locking mechanisms 252. Number of locking mechanisms 252 may include at least one of a hook and eye latch, a bolt latch, a box latch, a magnetic lock, or any other desirable type of locking mechanism. In some illustrative examples, number of locking mechanisms 252 may be positioned within movement system 226. In one example, number of locking mechanisms 252 may lock automatically when sliding closet 218 is placed into closed position 248. By releasing number of locking mechanisms 252, sliding closet 218 may be free to move relative to load-bearing wall 204.

Sliding closet 218 may be one option of a component that may be connected to load-bearing wall 204. Other components such as panel 243 or sliding closet 254 may be connected to load-bearing wall 204. Sliding closet 218 may be referred to as part of a modular system. In some illustrative examples, sliding closet 218, panel 243, or sliding closet 254 may be interchanged for each other.

Sliding closet 254 includes exterior wall 256, first wall 258, second wall 260, movement system 262, number of openings 264, and number of cavities 266. First wall 258 has width 268. Second wall 260 has width 270. Width 268 and width 270 are the same. Changing width 268 of first wall 258 and width 270 of second wall 260 will change depth 272 of sliding closet 254. Depth 272 of sliding closet 254 may be different than width 236 of sliding closet 218. By offering both width 236 and width 270, customers may customize the interior of platform 200.

The illustration of platform 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, sliding closet 218 may optionally interface with a track or other type of mechanism in the floor of passenger cabin 206. By interfacing with a track or other mechanism in the floor of passenger cabin 206, sliding closet 218 may move smoothly.

Figure 3:
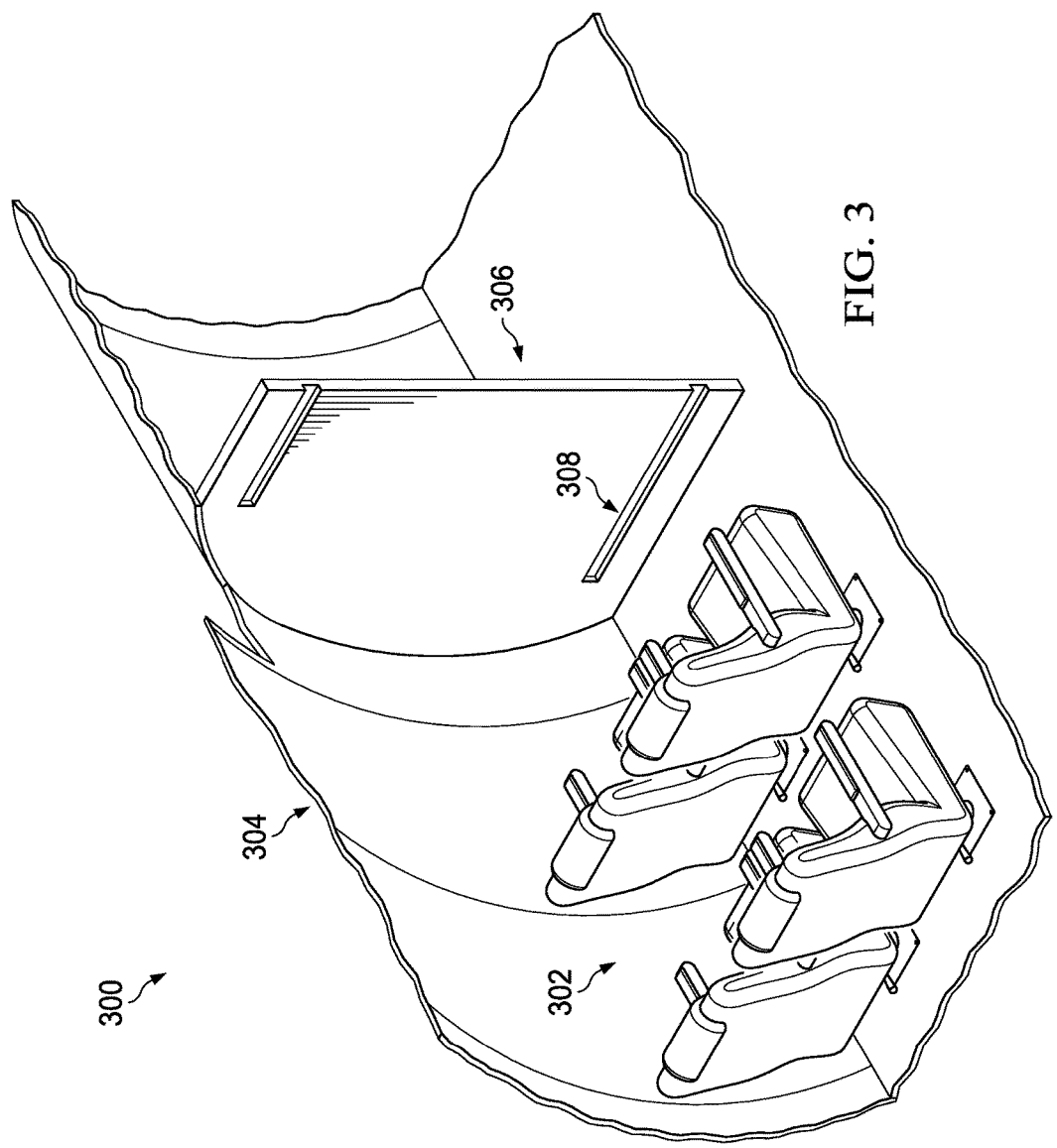
FIG. 3 is an illustration of an isometric view of a passenger cabin with a load-bearing wall in accordance with an illustrative embodiment.

Turning now to FIG. 3, an illustration of an isometric view of a passenger cabin with a load-bearing wall is depicted in accordance with an illustrative embodiment. Passenger cabin 300 may be a portion of passenger cabin 122 of FIG. 1. Passenger cabin 300 may be a physical implementation of a portion of passenger cabin 206 of FIG. 2.

As depicted, passenger cabin 300 has seats 302, curved wall 304, and load-bearing wall 306. Load-bearing wall 306 may be a physical implementation of load-bearing wall 204.

Load-bearing wall 306 may carry some portion of the load of the structure of passenger cabin 300. Load-bearing wall 306 is not entirely cosmetic. However, load-bearing wall 306 may include desirable cosmetic finishes on at least one side. In this illustrative example, load-bearing wall 306 has number of channels 308. Any desirable component may be connected to load-bearing wall 306 using number of channels 308. In other illustrative examples, load-bearing wall 306 may include a number of rails or any other desirable type of connection.

Figure 4:
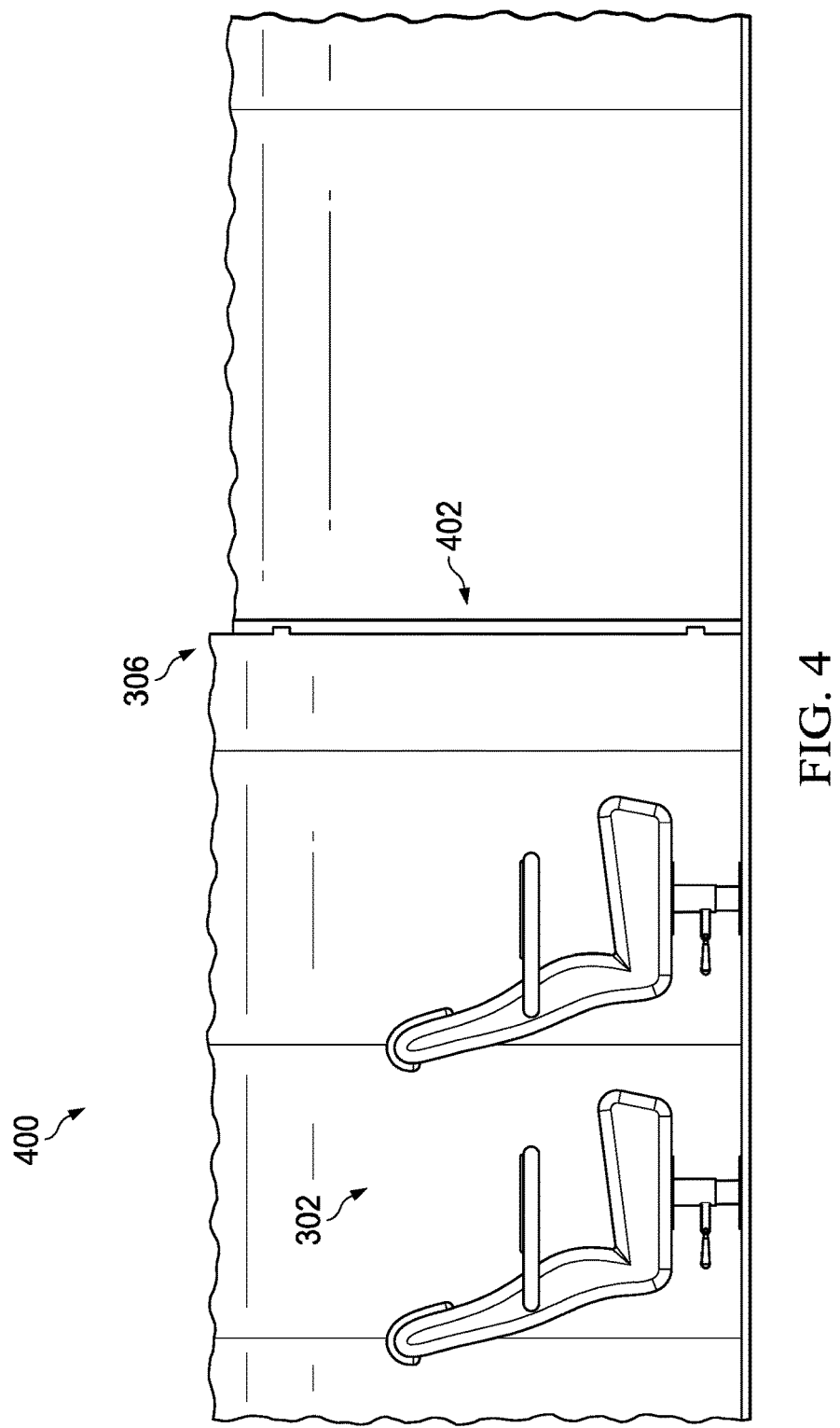
FIG. 4 is an illustration of a side view of a passenger cabin with a load-bearing wall in accordance with an illustrative embodiment.

Turning now to FIG. 4, an illustration of a side view of a passenger cabin with a load-bearing wall is depicted in accordance with an illustrative embodiment. View 400 is a side view of passenger cabin 300 of FIG. 3. As can be seen in view 400, load-bearing wall 306 may function as bulkhead 402 in passenger cabin 300.

Figure 5:
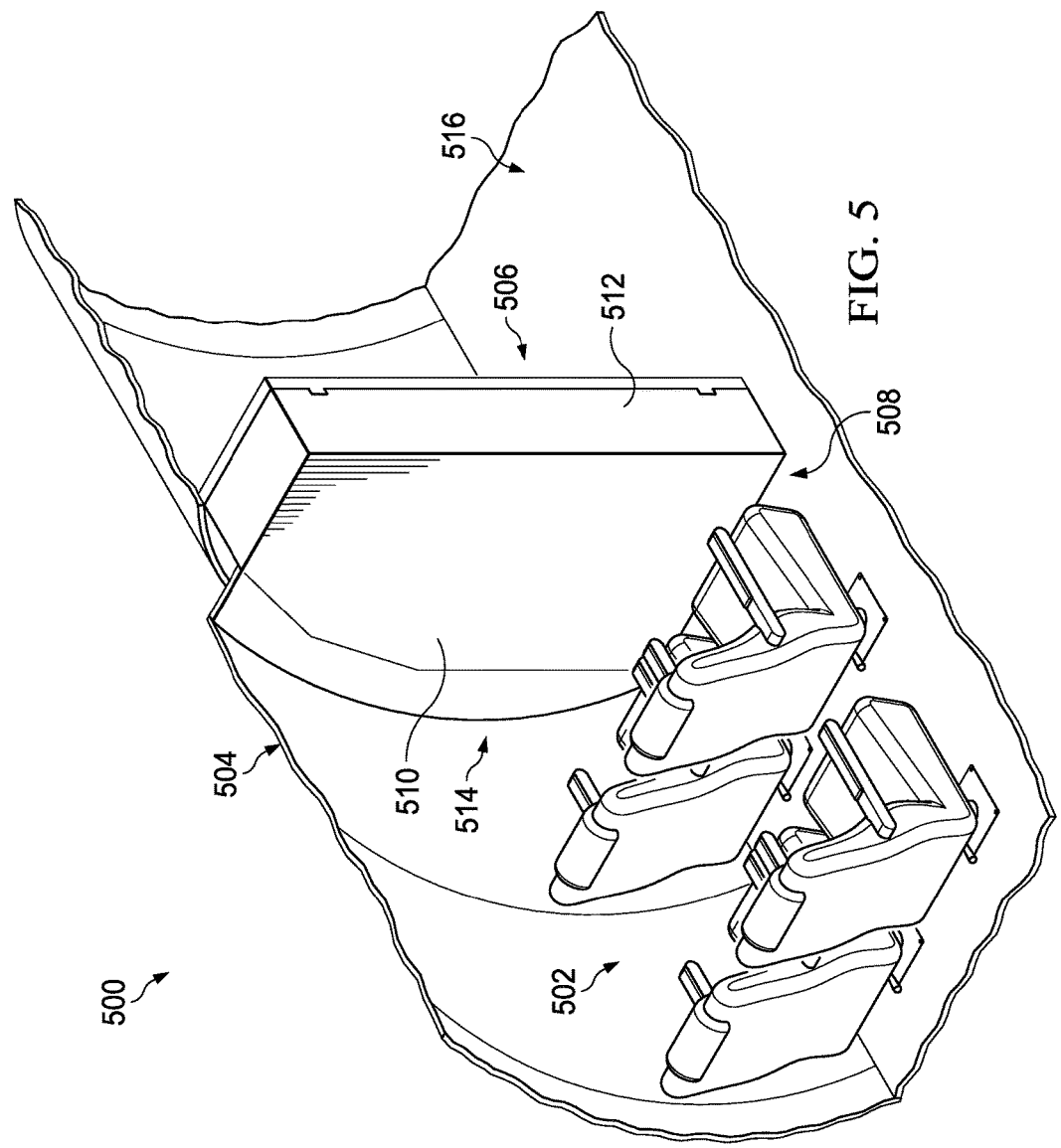
FIG. 5 is an illustration of an isometric view of a passenger cabin with a sliding closet in accordance with an illustrative embodiment.

Turning now to FIG. 5, an illustration of an isometric view of a passenger cabin with a sliding closet is depicted in accordance with an illustrative embodiment. Passenger cabin 500 may be a portion of passenger cabin 122 of FIG. 1. Passenger cabin 500 may be a physical implementation of a portion of passenger cabin 206 of FIG. 2.

As depicted, passenger cabin 500 has seats 502, curved wall 504, load-bearing wall 506, and sliding closet 508. Load-bearing wall 506 may be a physical implementation of load-bearing wall 204 of FIG. 2. Sliding closet 508 may be a physical implementation of sliding closet 218 of FIG. 2.

Load-bearing wall 506 may carry some portion of the load of the structure of passenger cabin 500. Load-bearing wall 506 is not entirely cosmetic. However, load-bearing wall 506 may include desirable cosmetic finishes on at least one side.

In this illustrative example, sliding closet 508 is connected to load-bearing wall 506. Sliding closet 508 is moveable relative to load-bearing wall 506. Sliding closet 508 has exterior wall 510 and first wall 512. Exterior wall 510 faces into passenger cabin 500. Specifically, exterior wall 510 faces seats 502. In this illustrative example, exterior wall 510 has curved edge 514.

First wall 512 faces into passenger cabin 500. More specifically, first wall 512 is perpendicular to exterior wall 510 and faces aisle 516.

Figure 6:
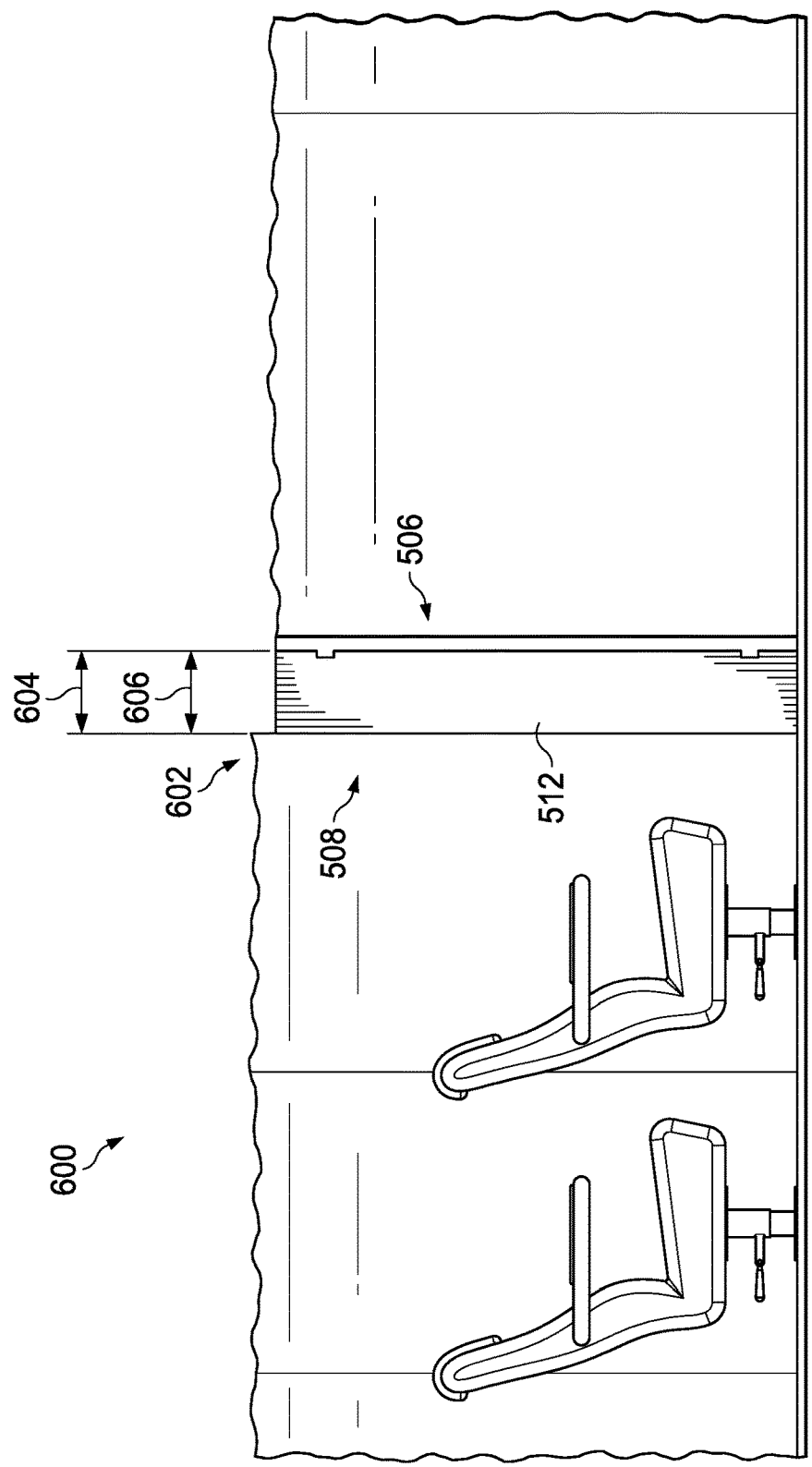
FIG. 6 is an illustration of a side view of a passenger cabin with a sliding closet in accordance with an illustrative embodiment.

Turning now to FIG. 6, an illustration of a side view of a passenger cabin with a sliding closet is depicted in accordance with an illustrative embodiment. View 600 is a side view of passenger cabin 500 of FIG. 5. As can be seen in view 600, sliding closet 508 and load-bearing wall 506 may function as bulkhead 602 in passenger cabin 500.

Further, first wall 512 has width 604. Width 604 of first wall 512 affects depth 606 of sliding closet 508. Increasing width 604 of first wall 512 may also increase depth 606 of sliding closet 508. Decreasing width 604 of first wall 512 may also decrease depth 606 of sliding closet 508.

Figure 7:
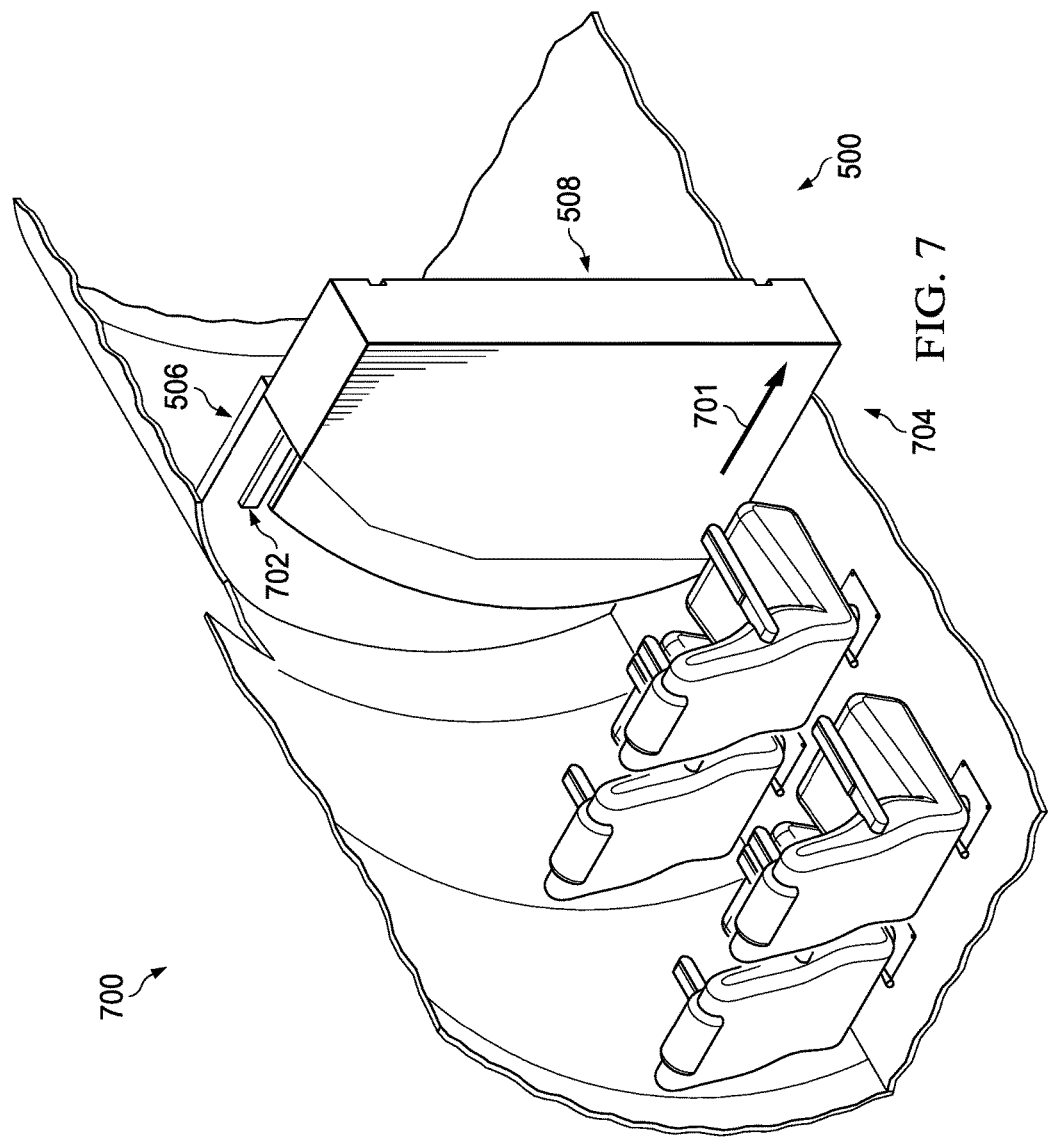
FIG. 7 is an illustration of an isometric view of a passenger cabin with a sliding closet in accordance with an illustrative embodiment.

Turning now to FIG. 7, an illustration of an isometric view of a passenger cabin with a sliding closet is depicted in accordance with an illustrative embodiment. View 700 is an isometric view of passenger cabin 500. In view 700, sliding closet 508 has moved in direction 701 relative to load-bearing wall 506.

In this illustrative example, sliding closet 508 has moved relative to load-bearing wall 506 along number of rails 702 of load-bearing wall 506. As depicted, sliding closet 508 may be described as being in open position 704. When sliding closet 508 is in open position 704, items may be placed into sliding closet 508.

To move sliding closet 508 in direction 701, a number of locking mechanisms (not depicted) may be released. To restrain sliding closet 508 from movement relative to load-bearing wall 506, the number of locking mechanisms (not depicted) may be activated.

Figure 8:
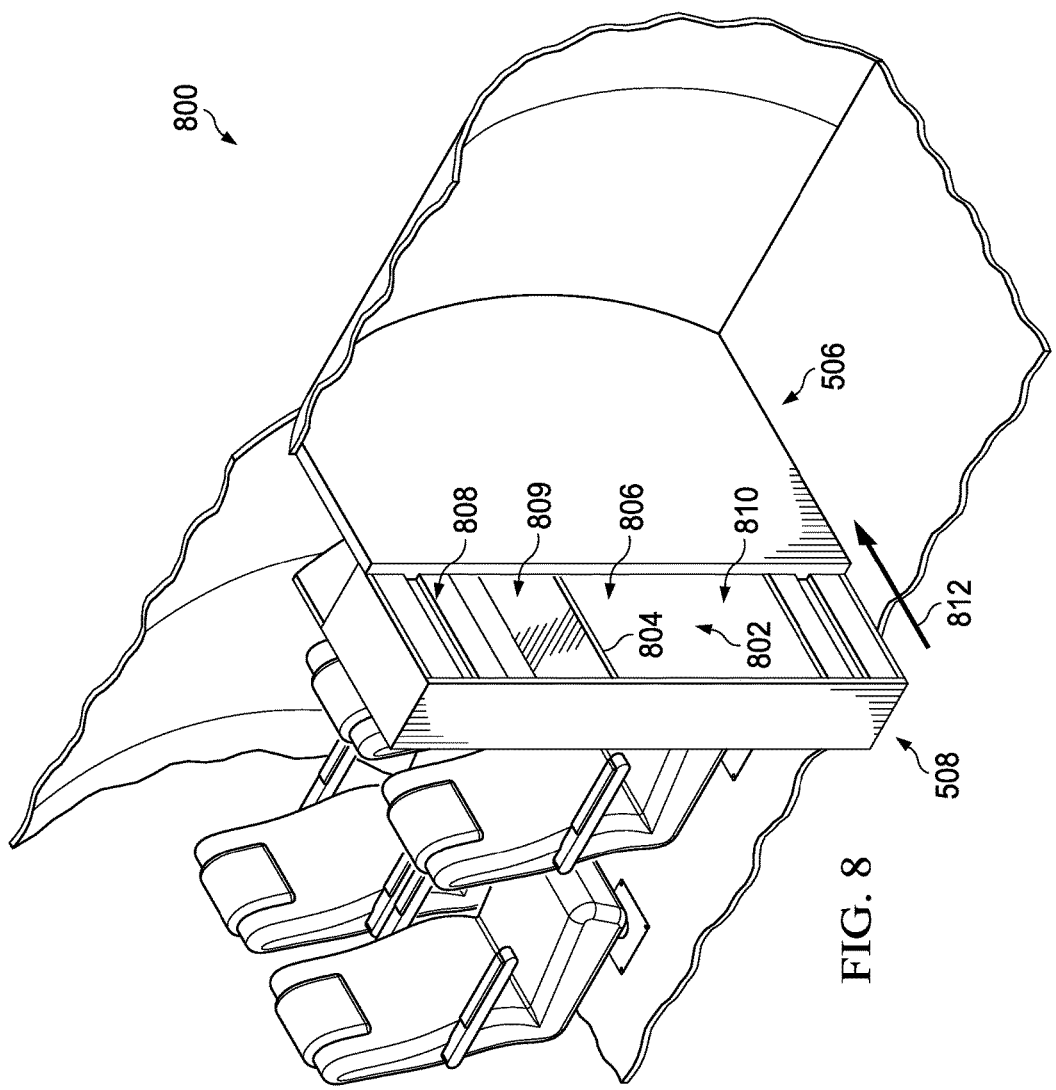
FIG. 8 is an illustration of a back isometric view of a passenger cabin with a sliding closet in accordance with an illustrative embodiment.

Turning now to FIG. 8, an illustration of a back isometric view of a passenger cabin with a sliding closet is depicted in accordance with an illustrative embodiment. View 800 is a back isometric view of passenger cabin 500 of FIG. 5. View 800 is another view of passenger cabin 500 after sliding closet 508 has moved in direction 701 of FIG. 7 relative to load-bearing wall 506.

In view 800, number of openings 802, divider 804, number of cavities 806, and number of channels 808 are visible. Number of channels 808 may interact with number of rails 702 of FIG. 7 of load-bearing wall 506 to provide sliding movement of sliding closet 508. Number of channels 808 may be referred to as a movement system for sliding closet 508.

Items may be placed into sliding closet 508 by placing the items through one of number of openings 802 and into one of number of cavities 806. Divider 804 causes the quantity of number of cavities 806 to be two total cavities. Upper cavity 809 of number of cavities 806 may be used to store smaller items such as hats, gloves, or small packages. Lower cavity 810 of number of cavities 806 may be used to store larger or longer items such as umbrellas, jackets, or large packages. To place sliding closet 508 into a closed position, sliding closet 508 may be moved in direction 812.

Figure 9:
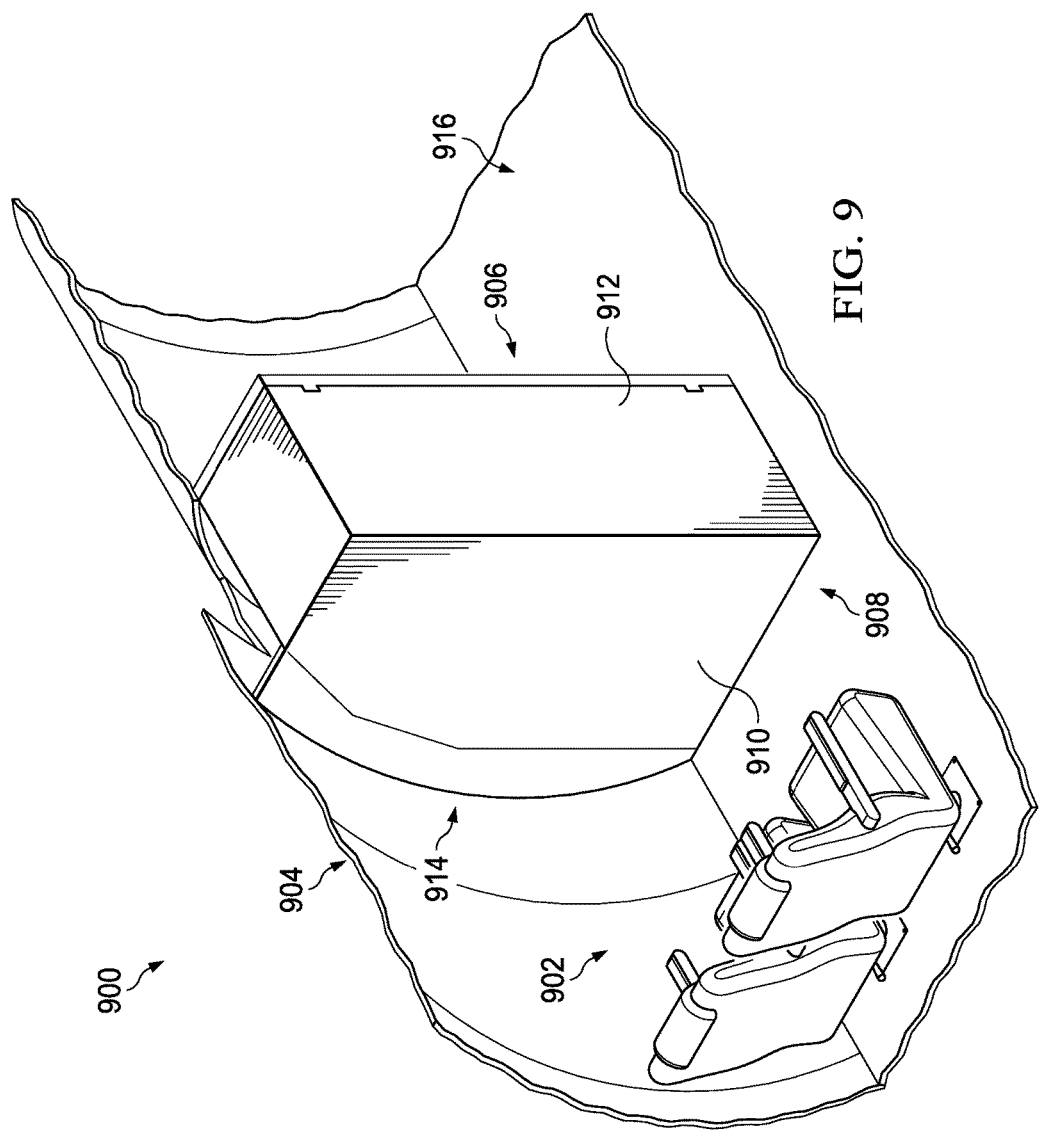
FIG. 9 is another illustration of an isometric view of a passenger cabin with a sliding closet in accordance with an illustrative embodiment.

Turning now to FIG. 9, another illustration of an isometric view of a passenger cabin with a sliding closet is depicted in accordance with an illustrative embodiment. Passenger cabin 900 may be a portion of passenger cabin 122 of FIG. 1. Passenger cabin 900 may be a physical implementation of a portion of passenger cabin 206 of FIG. 2.

As depicted, passenger cabin 900 has seats 902, curved wall 904, load-bearing wall 906, and sliding closet 908. Load-bearing wall 906 may be a physical implementation of load-bearing wall 204 of FIG. 2. Sliding closet 908 may be a physical implementation of sliding closet 218 of FIG. 2.

Load-bearing wall 906 may carry some portion of the load of the structure of passenger cabin 900. Load-bearing wall 906 is not entirely cosmetic. However, load-bearing wall 906 may include desirable cosmetic finishes on at least one side.

In this illustrative example, sliding closet 908 is connected to load-bearing wall 906. Sliding closet 908 is moveable relative to load-bearing wall 906. Sliding closet 908 has exterior wall 910 and first wall 912. Exterior wall 910 faces into passenger cabin 900. Specifically, exterior wall 910 faces seats 902. In this illustrative example, exterior wall 910 has curved edge 914.

First wall 912 faces into passenger cabin 900. More specifically, first wall 912 is perpendicular to exterior wall 910 and faces aisle 916.

Sliding closet 908 may have the same types of components as sliding closet 508 of FIG. 5. However, sliding closet 908 may have different dimensions than sliding closet 508. Sliding closet 908 and sliding closet 508 may be interchangeable options for an aircraft.

However, as depicted, the quantity of rows in seats 902 may be lower than the quantity of rows in seats 502 of FIG. 5. Accordingly, some redesign of the seats within passenger cabin 900 may occur to exchange sliding closet 908 for sliding closet 508 or vice versa.

However, sliding closet 908 or sliding closet 508 may be exchanged without removing load-bearing wall 906. Load-bearing wall 906 may be configured to carry loads and also be connected to any of a number of sliding closets with different dimensions. For this reason, load-bearing wall 906 may be referred to as a universal wall. Load-bearing wall 906 may be referred to as a standard component. This universal wall need not be exchanged when exchanging sliding closet 908 for another component.

Figure 10:
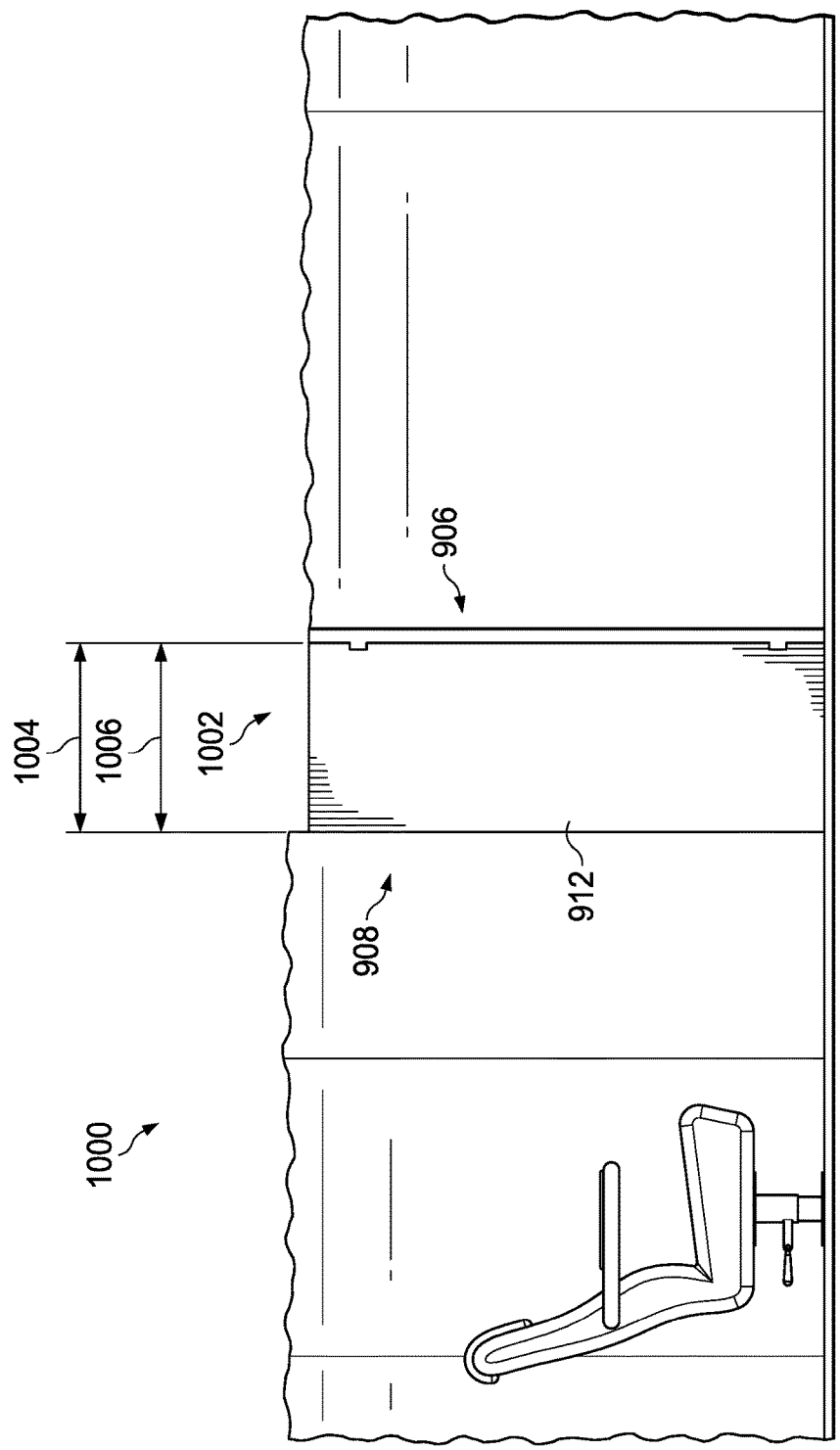
FIG. 10 is another illustration of a side view of a passenger cabin with a sliding closet in accordance with an illustrative embodiment.

Turning now to FIG. 10, another illustration of a side view of a passenger cabin with a sliding closet is depicted in accordance with an illustrative embodiment. View 1000 is a side view of passenger cabin 900 of FIG. 9. As can be seen in view 1000, sliding closet 908 and load-bearing wall 906 may function as bulkhead 1002 in passenger cabin 900.

Further, first wall 912 has width 1004. Width 1004 of first wall 912 affects depth 1006 of sliding closet 908. Increasing width 1004 of first wall 912 may also increase depth 1006 of sliding closet 908. Decreasing width 1004 of first wall 912 may also decrease depth 1006 of sliding closet 908.

As can be seen, width 1004 is greater than width 604 of FIG. 6. Likewise, depth 1006 of sliding closet 908 is greater than depth 606 of sliding closet 508 of FIG. 6.

Figure 11:
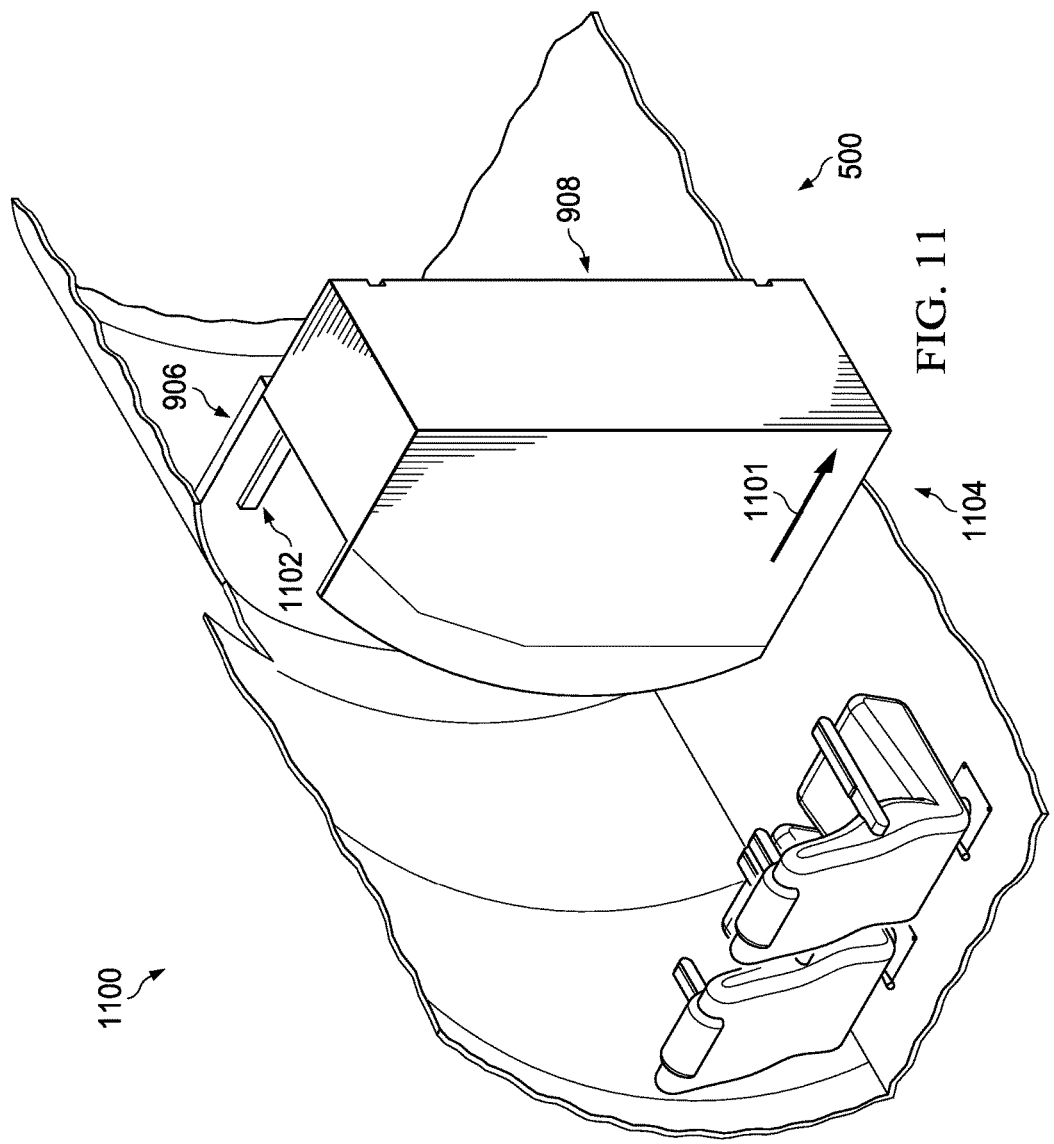
FIG. 11 is another illustration of an isometric view of a passenger cabin with a sliding closet in accordance with an illustrative embodiment.

Turning now to FIG. 11, another illustration of an isometric view of a passenger cabin with a sliding closet is depicted in accordance with an illustrative embodiment. View 1100 is an isometric view of passenger cabin 500. In view 1100, sliding closet 908 has moved in direction 1101 relative to load-bearing wall 906.

In this illustrative example, sliding closet 908 has moved relative to load-bearing wall 906 along number of rails 1102 of load-bearing wall 906. As depicted, sliding closet 908 may be described as being in open position 1104. When sliding closet 908 is in open position 1104, items may be placed into sliding closet 908.

To move sliding closet 908 in direction 1101, a number of locking mechanisms (not depicted) may be released. To restrain sliding closet 908 from movement relative to load-bearing wall 906, the number of locking mechanisms (not depicted) may be activated.

Figure 12:
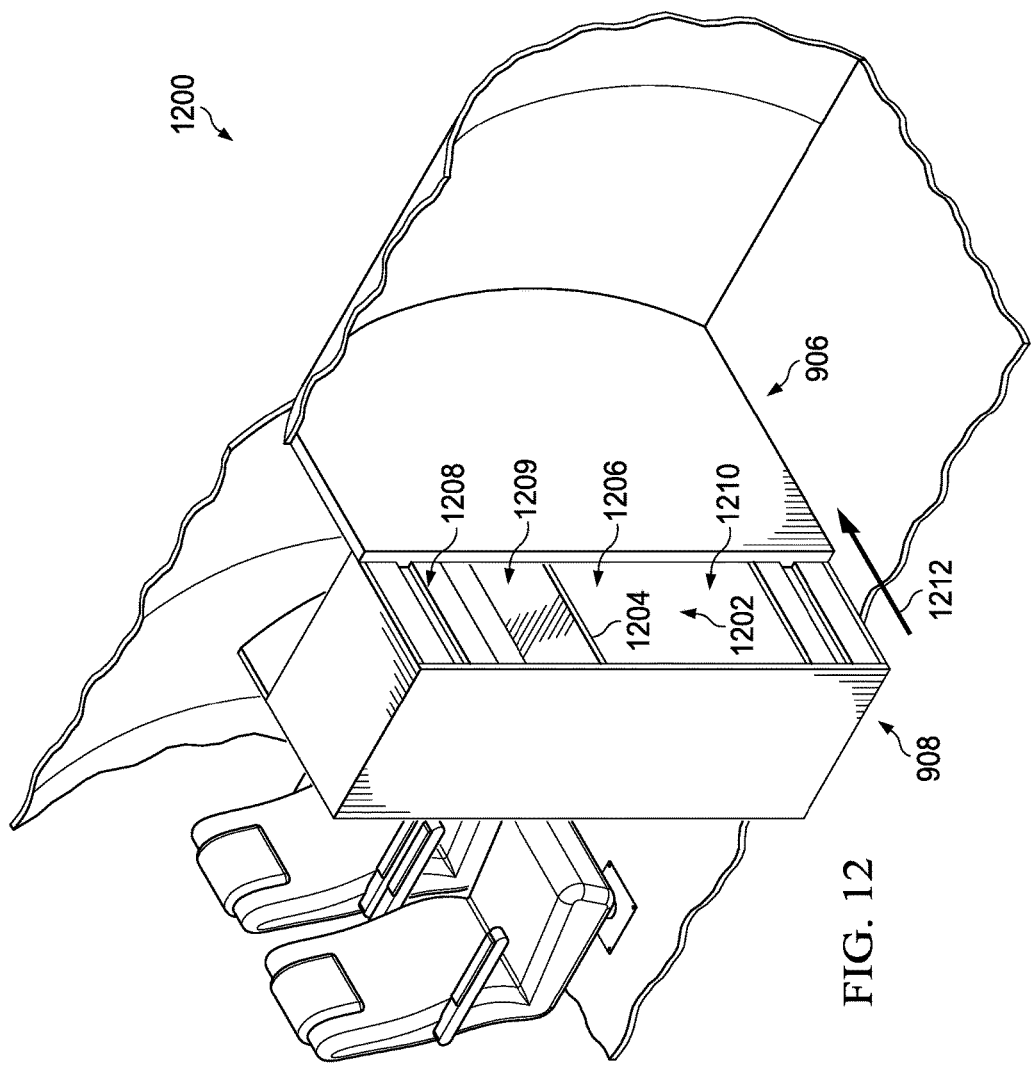
FIG. 12 is another illustration of a back isometric view of a passenger cabin with a sliding closet in accordance with an illustrative embodiment.

Turning now to FIG. 12, another illustration of a back isometric view of a passenger cabin with a sliding closet is depicted in accordance with an illustrative embodiment. View 1200 is a back isometric view of passenger cabin 900 of FIG. 9. View 1200 is another view of passenger cabin 900 after sliding closet 908 has moved in direction 1101 of FIG. 11 relative to load-bearing wall 906.

In view 1200, number of openings 1202, divider 1204, number of cavities 1206, and number of channels 1208 are visible. Number of channels 1208 may interact with number of rails 1102 of FIG. 11 of load-bearing wall 906 to provide sliding movement of sliding closet 908. Number of channels 1208 may be referred to as a movement system for sliding closet 908.

Items may be placed into sliding closet 908 by placing the items through one of number of openings 1202 and into one of number of cavities 1206. Divider 1204 causes the quantity of number of cavities 1206 to be two total cavities. Upper cavity 1209 of number of cavities 1206 may be used to store smaller items such as hats, gloves, or small packages. Lower cavity 1210 of number of cavities 1206 may be used to store larger or longer items such as umbrellas, jackets, or large packages. To place sliding closet 908 into a closed position, sliding closet 908 may be moved in direction 1212.

Figure 13:
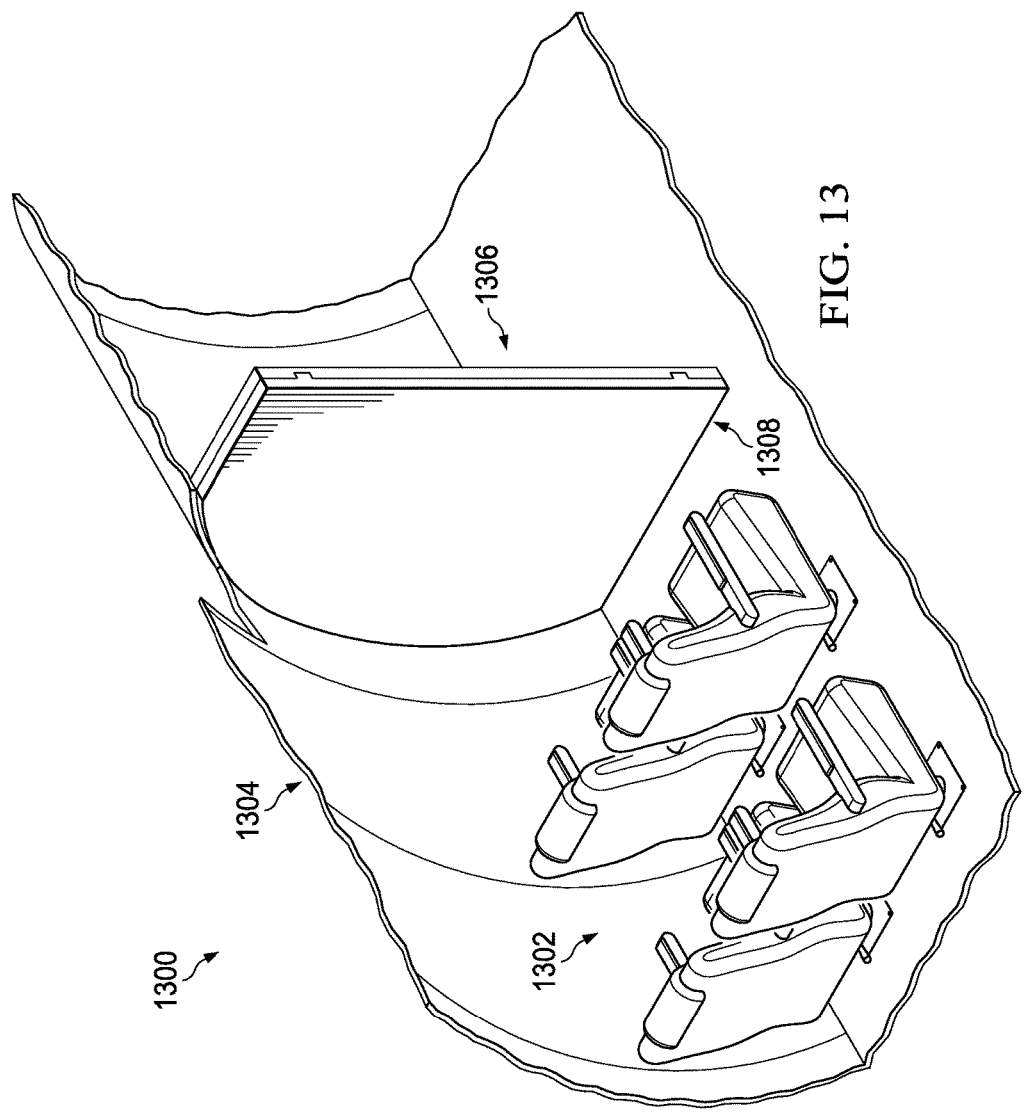
FIG. 13 is an illustration of an isometric view of a passenger cabin with a decorative panel on a load-bearing wall in accordance with an illustrative embodiment.

Turning now to FIG. 13, an illustration of an isometric view of a passenger cabin with a decorative panel on a load-bearing wall is depicted in accordance with an illustrative embodiment. Passenger cabin 1300 may be a portion of passenger cabin 122 of FIG. 1. Passenger cabin 1300 may be a physical implementation of a portion of passenger cabin 206 of FIG. 2.

As depicted, passenger cabin 1300 has seats 1302, curved wall 1304, load-bearing wall 1306, and panel 1308. Load-bearing wall 1306 may be a physical implementation of load-bearing wall 204 of FIG. 2.

Load-bearing wall 1306 may carry some portion of the load of the structure of passenger cabin 1300. Load-bearing wall 1306 is not entirely cosmetic. However, load-bearing wall 1306 may include desirable cosmetic finishes on at least one side.

In this illustrative example, panel 1308 is connected to load-bearing wall 1306. Panel 1308 is not moveable relative to load-bearing wall 1306. Panel 1308 faces seats 1302. Panel 1308 may also be described as a decorative panel. Panel 1308 may have any desirable finish. Panel 1308 may serve as a cover for any number of channels or any number of rails of load-bearing wall 1306.

In some illustrative examples, panel 1308 may be permanent. For example, a sliding closet may not be desired. Panel 1308 may cover a number of rails or a number of channels of load-bearing wall 1306. Panel 1308 may provide desirable aesthetics. In some illustrative examples, panel 1308 may provide additional functionality. For example, panel 1308 may also provide advertising.

In some examples, panel 1308 may be temporary. Panel 1308 may be a placeholder until a sliding closet is ordered and installed. Because panel 1308 is interchangeable, a customer may be able to exchange panel 1308 for other desirable components at a later date.

Figure 14:
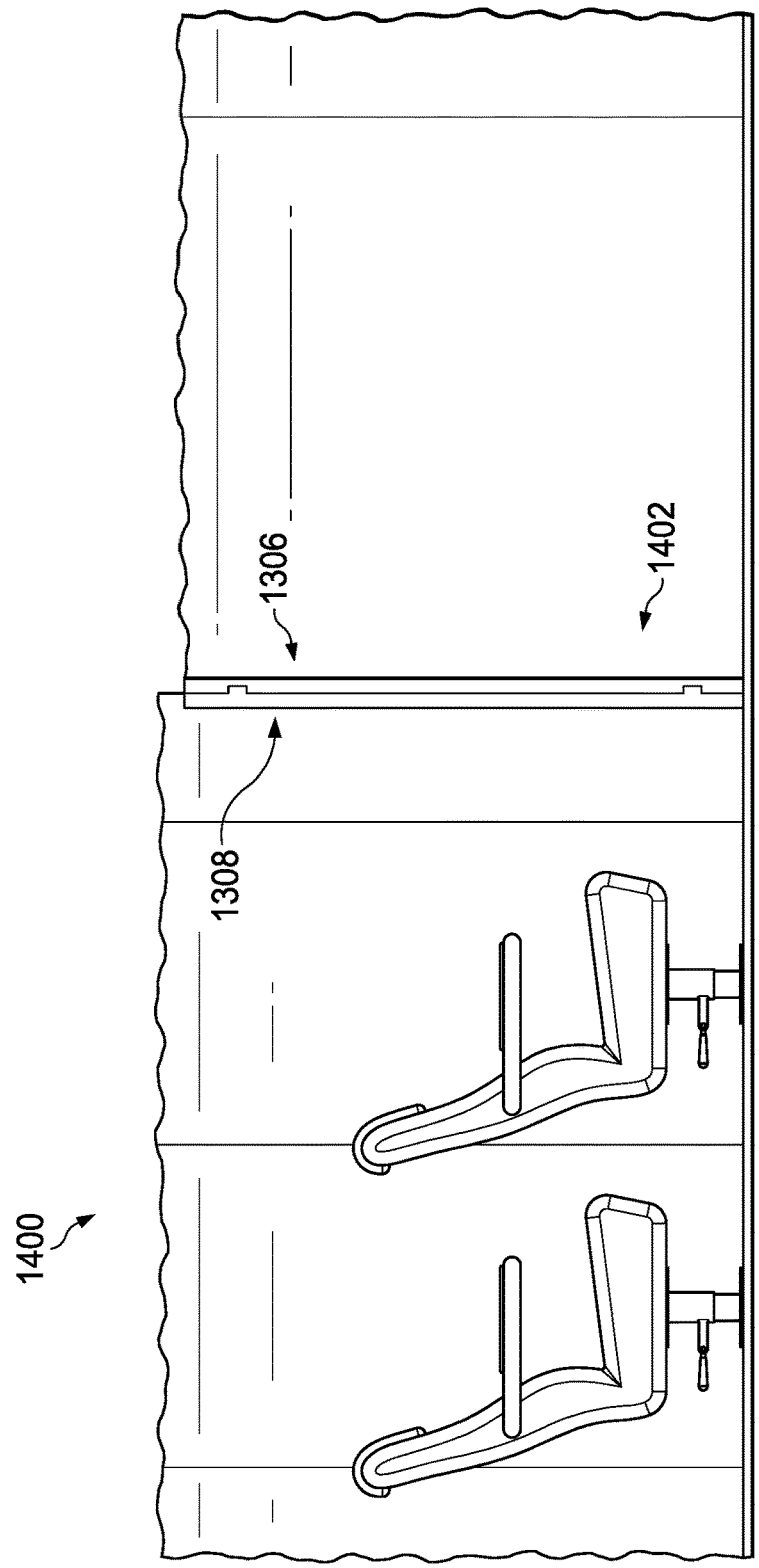
FIG. 14 is an illustration of a side view of a passenger cabin with a decorative panel on a load-bearing wall in accordance with an illustrative embodiment.

Turning now to FIG. 14, an illustration of a side view of a passenger cabin with a decorative panel on a load-bearing wall is depicted in accordance with an illustrative embodiment. View 1400 is a side view of passenger cabin 1300 of FIG. 13. As can be seen in view 1400, panel 1308 and load-bearing wall 1306 may function as bulkhead 1402 in passenger cabin 1300.

The different components shown in FIG. 1 and FIGS. 3-14 may be combined with components in FIG. 2, used with components in FIG. 2, or a combination of the two. Additionally, some of the components in FIG. 1 and FIGS. 3-14 may be illustrative examples of how components shown in block form in FIG. 2 can be implemented as physical structures.

Turning now to FIG. 15, an illustration of a flowchart of a method for creating an assembly in a passenger cabin of a vehicle is depicted in accordance with an illustrative embodiment. Process 1500 may be used to install components in passenger cabin 206 of FIG. 2. Process 1500 may be used to install components of FIGS. 5-14. For example, process 1500 may be used to install sliding closet 508 of FIG. 5, sliding closet 908 of FIG. 9, or panel 1308 of FIG. 13.

Process 1500 first installs a load-bearing wall having a number of rails in a passenger cabin of a vehicle (operation 1502). Process 1500 then connects a panel associated with a number of channels to the load-bearing wall using the number of channels and the number of rails (operation 1504). Afterwards the process terminates. The panel may be directly or indirectly connected to the load-bearing wall. The panel may be any desirable component. For example, the panel may be a decorative panel such as panel 1308 of FIG. 13. In some illustrative examples, the panel may be a component of a sliding closet. For example, the panel may be exterior wall 510 of sliding closet 508 or exterior wall 910 of sliding closet 908.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, process 1500 may further comprise restraining the sliding closet using a locking mechanism. Process 1500 may also comprise releasing the locking mechanism and moving the sliding closet along the number of rails using the number of channels.

As another example, the panel is a decorative panel facing into a passenger cabin of a vehicle. In this example, process 1500 may further comprise removing the panel from the load-bearing wall and connecting a sliding closet associated with a number of channels to the load-bearing wall using the number of channels and the number of rails.

Illustrative embodiments of the disclosure may be described in the context of aircraft manufacturing and service method 1600, as shown in FIG. 16, and aircraft 1700, as shown in FIG. 17. Turning first to FIG. 16, an illustration of an aircraft manufacturing and service method is depicted in accordance with an illustrative embodiment. During pre-production, aircraft manufacturing and service method 1600 may include specification and design 1602 of aircraft 1700 and material procurement 1604.

During production, component and subassembly manufacturing 1606 and system integration 1608 of aircraft 1700 in FIG. 17 takes place. Thereafter, aircraft 1700 may go through certification and delivery 1610 in order to be placed in service 1612. While in service 1612 by a customer, aircraft 1700 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an illustrative embodiment may be implemented. In this example, aircraft 1700 is produced by aircraft manufacturing and service method 1600 in FIG. 16, and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16. One or more illustrative embodiments may be used during component and subassembly manufacturing 1606. For example, load-bearing wall 204 in FIG. 2 may be installed during component and subassembly manufacturing 1606. Further, sliding closet 218 may be connected to load-bearing wall 204 during either component and subassembly manufacturing 1606 or maintenance and service 1614. For example, aircraft 1700 may be inspected during scheduled maintenance for aircraft 1700.

Thus, one or more illustrative embodiments may provide a method and apparatus for creating storage in a platform. A load-bearing wall may be associated with at least one of a number of rails or a number of channels. A panel is connected to the load-bearing wall using at least one of the number of rails or the number of channels. The panel may take the form of a decorative panel or a portion of a sliding closet.

By having a sliding closet, passengers may have a greater volume for storage. Further, ease of use of a closet in a bulkhead may be increased.

Yet further, passenger cabins may be retroactively updated with any one of a number of interchangeable components. For example, a decorative panel, a sliding closet, or other component may be removed and replaced with any other desirable component.

Yet further, the time for design of passenger cabins may be reduced. Specifically, the use of a universal load-bearing wall may reduce design time by eliminating load-bearing calculations each time a closet is added to a passenger cabin.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a load-bearing wall having a number of rails inside a passenger cabin of a vehicle; and
a sliding closet connected to the load-bearing wall using the number of rails and movable between an open position and a closed position;
wherein the sliding closet has an exterior wall that faces into the passenger cabin in both the open and closed positions, a first wall and a second wall perpendicular to the exterior wall, a number of openings parallel to the exterior wall, and the number of openings leads to a number of cavities formed by the exterior wall, the first wall, the second wall, and the number of openings, and the number of openings is closed by the load-bearing wall when the sliding closet is in the closed position.

2. The apparatus of claim 1, wherein the load-bearing wall is a standard component, and wherein the sliding closet is an interchangeable component.

3. The apparatus of claim 1, wherein the exterior wall is a decorative panel.

4. The apparatus of claim 1, wherein the sliding closet further comprises a number of channels parallel to the number of openings.

5. The apparatus of claim 4, wherein the number of channels is configured to connect to the number of rails, and wherein the sliding closet may move along the number of channels.

6. The apparatus of claim 1, wherein changing a width of the first wall and the second wall changes a depth of the sliding closet.

7. The apparatus of claim 1, wherein the exterior wall has a curved side, wherein the sliding closet is in an aircraft, and wherein the curved side is complementary to an interior surface of the passenger cabin of the aircraft.

8. A method comprising:
installing a load-bearing wall having a number of rails in a passenger cabin of a vehicle; and
connecting a sliding closet associated with a number of channels to the load-bearing wall using the number of channels and the number of rails such that the sliding closet is movable between an open position and a closed position, wherein the sliding closet has an exterior wall that faces into the passenger cabin in both the open and closed positions, a first wall and a second wall perpendicular to the exterior wall, a number of openings parallel to the exterior wall and the number of openings leads to a number of cavities formed by the exterior wall, the first wall, the second wall, and the number of openings, and the number of openings is closed by the load-bearing wall when the sliding closet is in the closed position.

9. The method of claim 8, further comprising:
restraining the sliding closet using a locking mechanism.

10. The method of claim 9 further comprising:
releasing the locking mechanism; and
moving the sliding closet along the number of rails using the number of channels.

11. The method of claim 8, further comprising:
removing the sliding closet from the load-bearing wall; and
connecting a decorative panel facing into the passenger cabin of the vehicle associated with a second number of channels to the load-bearing wall using the second number of channels and the number of rails.

* * * * *